(12) United States Patent
Gupta et al.

(10) Patent No.: US 9,639,306 B1
(45) Date of Patent: May 2, 2017

(54) METHODS AND SYSTEMS FOR CELL DESIGN IN A PRODUCTION ENVIRONMENT

(71) Applicant: Xerox Corporation, Norwalk, CT (US)

(72) Inventors: Manoj Gupta, Bangalore (IN); Jagadeesh Chandra Bose Rantham Prabhakara, Andhra Pradesh (IN); Sudhendu Rai, Fairport, NY (US); Partha Dutta, Bangalore (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/221,752

(22) Filed: Jul. 28, 2016

(51) Int. Cl.
*G06K 15/02* (2006.01)
*G06F 3/12* (2006.01)

(52) U.S. Cl.
CPC .......... *G06F 3/1226* (2013.01); *G06F 3/1205* (2013.01); *G06F 3/1211* (2013.01); *G06F 3/1262* (2013.01)

(58) Field of Classification Search
USPC ........ 358/1.1–3.29; 705/52, 7.13–7.16, 7.21, 705/7.26, 7.27, 26.5
See application file for complete search history.

(56) References Cited

U.S. PATENT DOCUMENTS

| | | | |
|---|---|---|---|
| 7,079,266 B1* | 7/2006 | Rai | G06F 3/1211 358/1.13 |
| 7,859,692 B2* | 12/2010 | Snyderman | G06Q 10/06 358/1.1 |
| 8,059,292 B2* | 11/2011 | Rai | G06Q 10/06 358/1.13 |
| 8,259,331 B2* | 9/2012 | Jacobs | G06Q 10/06 358/1.15 |
| 8,934,112 B1* | 1/2015 | Gross | G06F 3/1229 358/1.1 |
| 2014/0240737 A1* | 8/2014 | Gross | G06F 3/1204 358/1.13 |

* cited by examiner

*Primary Examiner* — Marcellus Augustin
(74) *Attorney, Agent, or Firm* — Fox Rothschild LLP

(57) ABSTRACT

A method of generating a cell design of print production devices for a print production environment includes receiving a print job list, and identifying a plurality of print production devices located in the production environment. The system identifies a list of functions associated with the print jobs, and generates a graph. The system determines a threshold value, and partitions the graph into a number of groups equal to the threshold value such that a number of edges extending between groups is minimized. The system generates an initial cell design for the print production environment, and causes a hardware setting of each of the plurality of production devices to be updated to reflect the cell to which the production device was assigned and to enable the production device to perform one or more functions associated with the cell to which the production device was assigned.

24 Claims, 9 Drawing Sheets

```
1  foreach cell C ∈ C do
2    while there exists an uncovered function in C and there exists some unassigned machine do
3      Let M be an unassigned machine that can perform maximum number of uncovered
       functions in C
4      if number of machines assigned to C in less than D then
5        Assign M to cell C
6        All the functions performed by M are now covered
```

FIG. 7

1 foreach cell $C \in C$ *where the number of assigned machines is less than D* do
2     while *there exists some unassigned machine* do
3         Let $M$ be an unassigned machine that can perform maximum number of functions in $C$
4         Assign $M$ to cell $C$ and set $M$ to have been assigned

*FIG. 8*

METHODS AND SYSTEMS FOR CELL DESIGN IN A PRODUCTION ENVIRONMENT

BACKGROUND

Print shops are document manufacturing systems that manufacture document-based products or items. The cost and performance metrics of a print shop typically depend on the equipment type and numbers and the associated production processes in a complex manner. This makes optimizing production device and production environment configurations difficult.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimension recited below. As used herein, the term "comprising" means "including, but not limited to."

In an embodiment, a system for generating a cell design of production devices for a production environment may include a plurality of production devices associated with a production environment, where each production device includes hardware for performing one or more functions on a job. The system may include an electronic device and a computer-readable storage medium that includes one or more programming instructions. The system may receive a job list from a scheduling queue of an intake system for a production environment, where the job list includes a plurality of jobs to be processed by the production environment, and may identify a plurality of production devices located in the production environment, where each production device includes hardware for performing one or more functions on a job. The system may, for each of the plurality of jobs, determine a function sequence associated with processing the job, and identify a list of functions associated with the plurality of jobs, where the list of functions includes an indicator of each unique function from the function sequences for the jobs. The system may generate a graph that includes one or more first nodes, one or more second nodes and one or more edges between one or more of the first nodes and one or more of the second nodes, where each first node represents a job from the plurality of jobs, each second node represents a function from the list of functions, and each edge represents an indication that the job associated with corresponding first node of the edge requires the function associated with the corresponding second node of the edge. The system may determine a threshold value equal to a maximum number of production devices permitted per cell of the production environment, and may partition the graph into a number of groups equal to the threshold value such that a number of edges extending between groups is minimized. Each group may correspond to a cell of the production environment. The system may generate an initial cell design for the production environment by assigning one or more of the plurality of production devices to the cells, and may cause a hardware setting of each of the plurality of production devices to be updated to reflect the cell to which the production device was assigned and to enable the production device to perform one or more functions associated with the cell to which the production device was assigned.

In an embodiment, the system may generate an initial cell design for the production environment by, for each cell, identifying, from the graph, the functions associated with the cell, identifying a production device that is capable of performing a maximum number of the functions and that has not already been assigned to another cell, determining whether the cell comprises a number of production devices that is less than the threshold value, and in response to determining that the cell comprises a number of production devices that is less than the threshold value, assigning the identified production device to the cell.

Optionally, the system may determine whether one or more of the production devices have not been assigned to a cell. In response to determining that one or more of the production devices have not been assigned to a cell, the system may identify a cell that includes fewer than the threshold number of production devices, and assign at least one of the one or more unassigned production devices to the identified cell.

In an embodiment, the system may perform a simulation of an operation of the initial cell design in processing the job list to generate the following performance metrics associated with the initial cell design: a number of late jobs, an inter-cellular level of movement, and a utilization value associated with one or more of the production devices in the cell.

The system may identify a threshold utilization rate for the plurality of production devices, identify a cell design parameter, identify a production device from a first cell in the initial cell design whose utilization value is greater than the threshold utilization rate, identify a second production device from a second cell in the initial cell design whose utilization value is less than the cell design parameter, determine whether the first cell includes a number of production devices that is less than the threshold value, and in response to determining that the first cell includes a number of production devices that is less than the threshold value, assigning the second production device to the first cell to generate an updated cell design.

Optionally, the system may perform a second simulation of an operation of the updated cell design in processing the job list to generate the following performance metrics associated with the updated cell design: a number of late jobs, an inter-cellular level of movement, and a utilization value associated with one or more of the production devices in the cell. The system may adopt the updated cell design as a final cell design if the number of late jobs associated with the updated cell design is less than the number of late jobs associated with the initial cell design.

In an embodiment, the system may identifying a threshold utilization rate for the plurality of production devices, identify a cell design parameter, identifying a production device from a first cell in the initial cell design whose utilization value is greater than the threshold utilization rate, identify a second production device from a second cell in the initial cell design whose utilization value is less than the cell design parameter, and determine whether the first cell includes a number of production devices that is less than the threshold value. In response to determining that the first cell does not include a number of production devices that is less than the threshold value, the system may determine whether the first cell comprises a third production device whose utilization value is less than the cell design parameter. In response to determining that the first cell comprises a third production device whose utilization value is less than the cell design parameter, the system may generate an update cell design by assigning the third production device to the second cell, and assigning the second production device to the first cell.

The system may perform a second simulation of an operation of the updated cell design in processing the job list to generate the following performance metrics associated with the updated cell design: a number of late jobs, an inter-cellular level of movement, and a utilization value associated with one or more of the production devices in the cell. The system may adopt the updated cell design as a final cell design if the number of late jobs associated with the updated cell design is less than the number of late jobs associated with the initial cell design.

In various embodiments, the production environment may be a print production environment that includes print production devices which process print jobs.

BRIEF DESCRIPTION OF THE DRAWINGS

FIG. 7 illustrates example pseudocode for assigning production devices to cells according to an embodiment.

FIG. 8 illustrates example pseudocode for assigning unassigned production devices to cells according to an embodiment.

DETAILED DESCRIPTION

Figure 1:
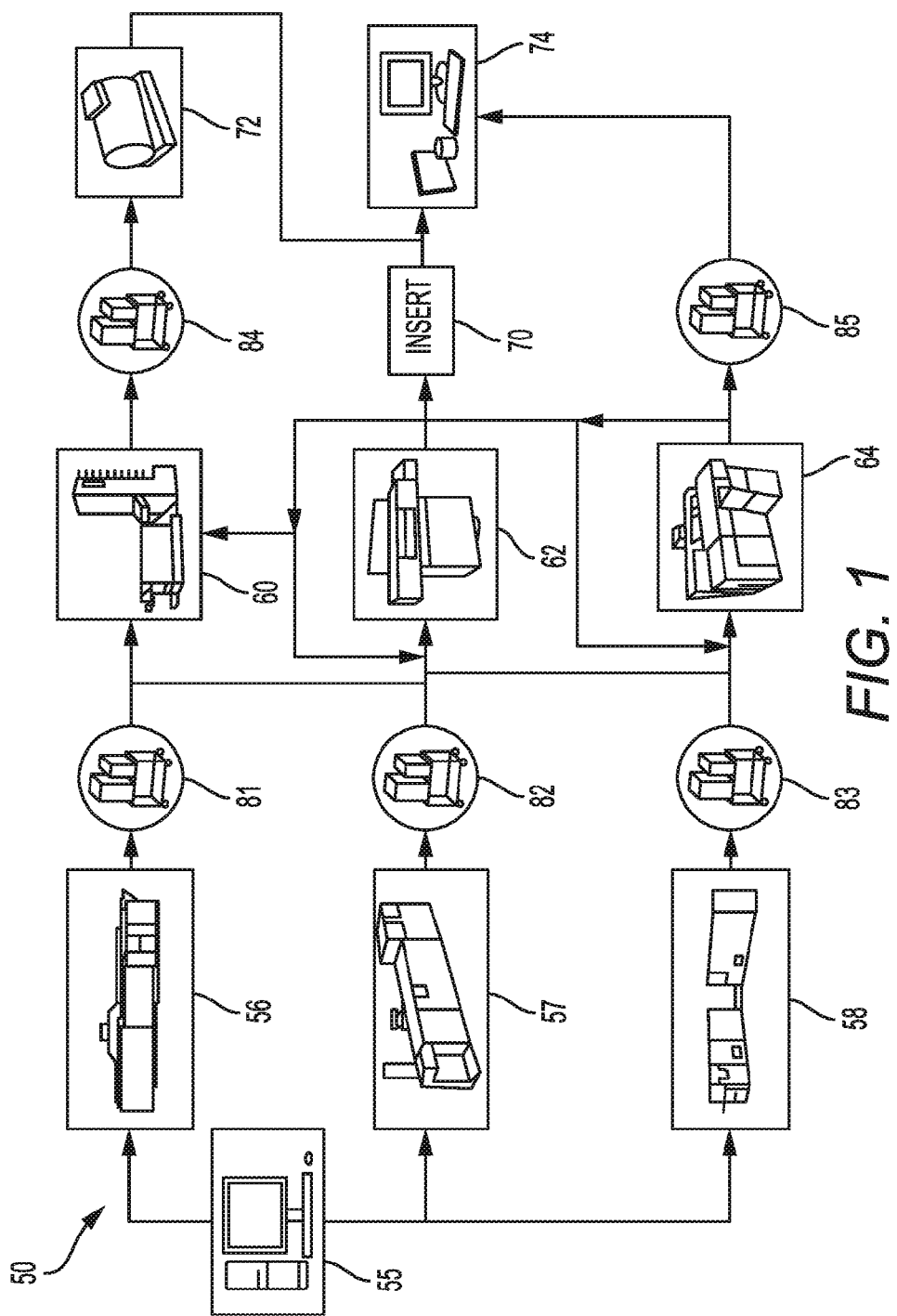
FIG. 1 illustrates an example of a production environment according to an embodiment.

The following terms shall have, for purposes of this application, the respective meanings set forth below:

A "cell" refers to one or more production devices in a production environment that are capable of processing at least a portion of a job. For example, in a print production environment, a cell may include one or more print production devices that are capable of processing at least a portion of a print job.

A "computing device" or "electronic device" refers to a device that includes a processor and tangible, computer-readable memory. The memory may contain programming instructions that, when executed by the processor, cause the electronic device to perform one or more operations according to the programming instructions. Examples of electronic devices include personal computers, servers, mainframes, gaming systems, televisions, and portable electronic devices such as smartphones, personal digital assistants, cameras, tablet computers, laptop computers, media players and the like.

A "job" refers to a logical unit of work that is to be completed for a customer. For example, in a print production environment, a job may include one or more print jobs from one or more clients. For example, a job in a vehicle production environment may include manufacturing a vehicle or a portion thereof. As another example, a job in a chemical production environment may include producing or processing a chemical product or a portion thereof. Similarly, a job in a computing device production environment may be to manufacture a computing device or a portion thereof such as, for example, a printer, a scanner or a copier.

A "job function" or a "function" refers to one or more processing steps associated with processing a job. In a print production environment, a "print job function" refers to one or more processing steps associated with processing a print job. Example print job functions may include, without limitation, printing, binding, collating, punching, scanning and/or the like.

A "print job" refers to a job processed in a print shop. For example, a print job may include a series of processing steps for producing credit card statements corresponding to a certain credit card company, producing bank statements corresponding to a certain bank, printing a document, or the like. In this document, a print job may refer to the set of instructions that cause the items to be produced or printed, as well as the work-in-progress and produced items themselves. Although the disclosed embodiments pertain to print jobs, the disclosed methods and systems can be applied to jobs in general in other production environments, such as automotive manufacturing, semiconductor production and the like.

A "production device" refers to a device that is capable of processing at least a portion of a job. For example, in a print production environment, an example production device may include, without limitation, a printer, scanner, collator, binder, hole punch and/or the like.

A "production environment" refers to machine and/or human labor used to complete one or more jobs. A production environment may include one or more production devices or other equipment that may be used to complete one or more jobs. Example production environments may include, without limitation, a print production environment, a chemical production environment, a vehicle production environment, a computing device manufacturing production environment, and/or other manufacturing production environments.

A production environment and the work flowing through it may be modeled to gain an understanding of the production environment's current state. One or more simulations of production environment operations may be performed to determine one or more parameters needed to achieve a desired state. One or more simulations may be used to identify opportunities to increase the overall productivity of production environments through the positioning of production devices and operators, changes in workflow routing, cross-training of production device operators and/or the like.

FIG. 1 shows an example of a production environment 50, in this case, example elements of a print shop. Print jobs may enter the print shop manually or electronically and be collected at an electronic submission system 55 such as a computing device and/or scanner. Jobs are sorted and batched at the submission system or another location before being delivered to one or more print engines such as a color printer 56, black-and-white printer 57 and/or a continuous feed printer 58. Jobs may exit the print engine and be delivered to one or more finishing devices or areas such as a collator 60, cutter 62, and/or binder 64. The finishing areas may include automatic or manual areas for such finishing activities and they also may include an automatic or manual inserter 70. Finally, jobs may move to a postage metering station 72 and/or shipping station 74. Jobs may move from one location to another in the print shop by automatic delivery or manual delivery such as by hand or by one or more paper carts 81-85.

Make-to-order is a manufacturing process in which manufacturing begins only after an order is received. In a make-to-order production environment, such as a print shop or assembly line productions, jobs may arrive over time. Each job may be defined by certain characteristics such as, for example, an arrival date, a due date, one or more functions that are to be performed to complete the job and/or the like.

A production environment may include one or more production devices to process the received jobs. Each production device has a set of characteristics such as, for example, the functions it can perform, its processing speed, its setup time and/or the like. A common objective of a production environment is to minimize the number of late jobs—jobs that are completed after their due dates. The way in which a production environment has been designed, such as the positioning of the production devices or the layout of the production devices in the production environment, can influence the processing time of jobs since jobs move between production devices. This movement is referred to in this disclosure as inter-cellular movement. This disclosure generally relates to determining configurations for a production environment that consider the number of late jobs and inter-cellular movement.

In an embodiment, a job may be associated with one or more job functions. A job function refers to a processing step that must be completed to process a job. A job function may be an action by which hardware of a production device acts on a workpiece. For instance, with respect to print jobs, example print job functions may include, without limitation, binding, collating, scanning, punching, printing, and/or the like. In certain embodiments, a job may be associated with a sequence of job functions that identify not only the job functions that are to be performed for a job, but also the order in which the job functions are to be performed.

Figure 2:
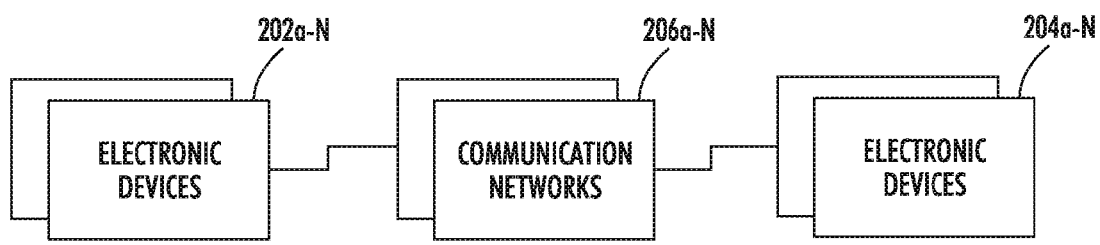
FIG. 2 illustrates an example system for generating cell designs for a production environment according to an embodiment.

FIG. 2 illustrates an example system for generating cell designs for a production environment according to an embodiment. In an embodiment, a system may include one or more electronic devices 202*a*-N in communication with one or more production devices 204*a*-N via one or more communication networks 206*a*-N.

Figure 3:
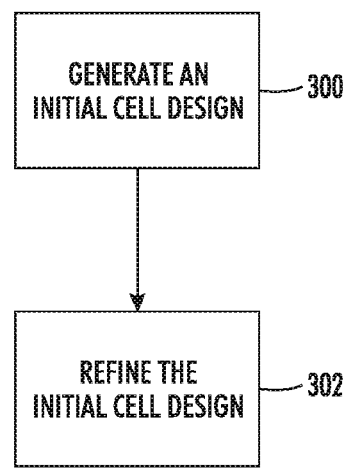
FIG. 3 illustrates a flow chart of an example method of generating a cell design for a production environment according to an embodiment.

FIG. 3 illustrates a flow chart of an example method of generating a cell design for a production environment according to an embodiment. As illustrated by FIG. 3, an electronic device may generate 300 an initial cell design and then improve or refine 302 the initial cell design.

Figure 4:
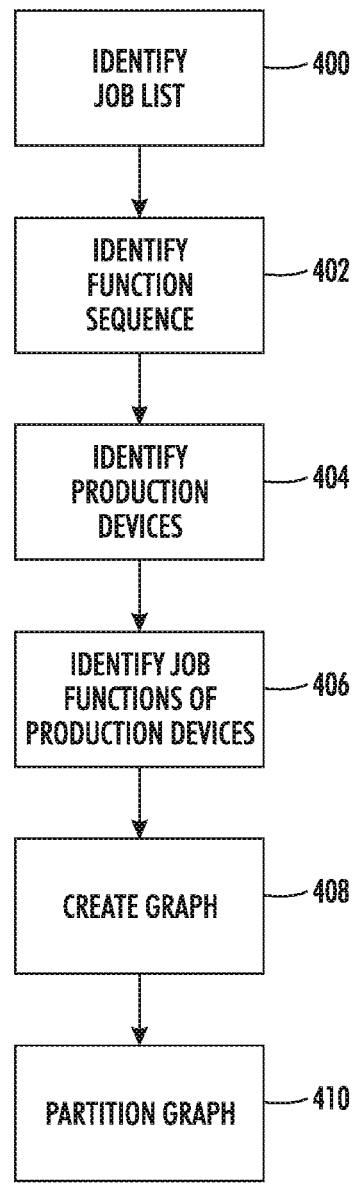
FIG. 4 illustrates a flow chart of an example method of generating an initial cell design according to an embodiment.

FIG. 4 illustrates a flow chart of an example method of generating 300 an initial cell design according to an embodiment. An electronic device may generate 300 an initial cell design by modeling the jobs and functions to be executed by a production environment as a graph partitioning algorithm. An electronic device analyzes a set of jobs and functions and creates a bipartite graph of jobs and functions. The output of this partitioning algorithm will divide functions to cells.

After the partition of the functions, an electronic device then assigns production devices that cater to the functions to each cell.

Referring to FIG. 4, an electronic device may identify 400 a job list. A job list may include an indication of one or more jobs that are to be processed by a production environment, or that have already been processed by a production environment. For instance, a job list may include an indication of pending jobs for a production environment. Alternatively, a job list may include a list of historical jobs that have been processed by a production environment. In yet another embodiment, a job list may include one or more hypothetical jobs that may be processed by a production environment at some time.

An electronic device may identify 400 a job list by receiving a list from a data store, such as one in communication with the electronic device. For instance, an electronic device may receive a list of jobs from a scheduling queue of an intake system. The jobs may be pending jobs or historical jobs that have been processed by the production environment over a period of time. As another example, an electronic device may receive a list of pending jobs from one or more production devices.

In an embodiment, an electronic device may identify 400 a job list by receiving a list of historical jobs from a data store associated with the electronic device, one or more productions devices and/or the like. In various embodiments, an electronic device may identify 400 a job list by receiving a list of jobs from a user of the electronic device.

In this disclosure, a job list is represented by $\mathfrak{J}$, and each job in the job list is represented by J.

An electronic device may identify 402 a function sequence, $F_J$, for one or more of the jobs in the job list. An electronic device may identify a function sequence for a job by identifying function information from the job list itself or by analyzing metadata associated with a job. From the function sequences, an electronic device may identify a set of distinct functions across all jobs. In this disclosure, $\mathcal{F}$ represents the set of distinct job functions across all jobs in $\mathfrak{J}$ (i.e., $\mathcal{F} = \cup_{J \in \mathfrak{J}} F_J$).

An electronic device may identify 404 one or more production devices of a production environment. An electronic device may identify 404 one or more production devices by accessing a list of production devices for a particular production environment. In another embodiment, an electronic device may identify 404 one or more production devices by communication with such devices to ascertain whether a production device is located within a particular production environment. In this disclosure, a set of production devices in a production environment may be represented by $\mathcal{M}$ and each production device in the production environment may be represented by M (i.e., M $\in$ $\mathcal{M}$). In various embodiments, a cell may only include a maximum number of production devices. This threshold may be specific to a production environment, and may vary from cell to cell. In certain embodiments, a production environment administrator, operator or other user may specify a threshold number of production devices for one or more cells. In this disclosure, a maximum number of production devices per cell is represented by D.

An electronic device may identify 406, for one or more of the identified production devices, one or more job functions that the production device is able to serve. For instance, if a production environment includes a multi-function device that is able to print black-and-white and staple, an electronic device may identify black-and-white printing and stapling as job functions of the production device.

In an embodiment, an electronic device may create 408 a graph. The graph may indicate a relationship between jobs and functions. For example, an electronic device may create 408 a bipartite graph, represented by $G(A \cup B)$, where each job $J \in \mathcal{J}$ is represented by a node in A, and each job function, $F \in \mathcal{F}$ is represented by a node in B.

Figure 5:
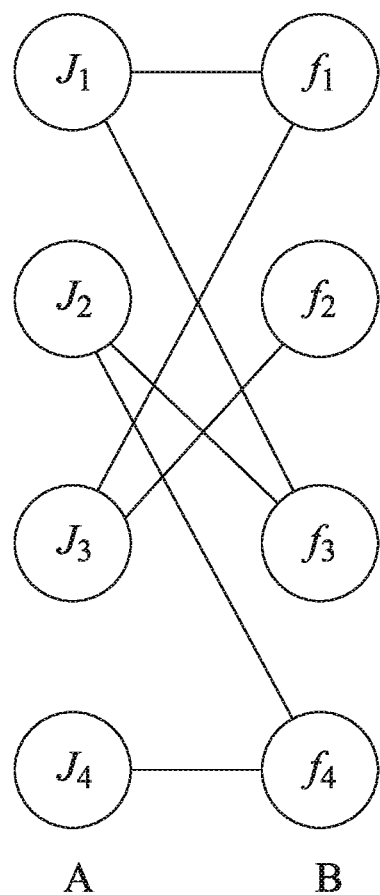
FIG. 5 illustrates an example bipartite graph according to an embodiment.

An electronic device may use the job function information for one or more jobs to generate a graph edge from J to F if $F \in F_J$. In other words, an electronic device may generate a graph edge if the job function F is in the function sequence of job J. FIG. 5 illustrates an example bipartite graph according to an embodiment. As illustrated by FIG. 5, a job list, $\mathcal{J}$, includes jobs, $J_1$, $J_2$, $J_3$ and $J_4$. And the functions, $\mathcal{F}$, include $f_1$, $f_2$, $f_3$, and $f_4$. An edge between a job and a function indicates that the job requires the function. For instance, in FIG. 5, an edge exists between $J_1$ and $f_1$, indicating that $J_1$ requires $f_1$ to be processed. Similarly, $J_2$ has an edge to $f_3$ and $f_4$, indicating that both functions $f_3$ and $f_4$ must be performed in the processing of $J_2$.

In an embodiment, an electronic device may partition 410 the graph such that the jobs functions are grouped in one or more groups. An electronic device may use various graph partitioning algorithms such as, for example, unstructured graph partitioning algorithms, multilevel graph partitioning algorithms, and/or the like to partition the graph.

The goal of the graph partitioning is to divide the graph, G, into a number of cells equal to $$\left\lceil \frac{|M|}{D} \right\rceil$$

such that the number of edges crossing over cells is minimized. The crossing over of edges in a graph signifies the movement of jobs from one cell to another. As such, partitioning a graph in a way that minimizes the number of crossing edges minimizes intercellular movement.

In an embodiment, an electronic device may partition 410 a graph into a number of partitions, K, where $$K = \left\lceil \frac{|M|}{D} \right\rceil.$$

Each partition may correspond to a different cell. If $C = C_1, C_2, \ldots, C_K$ is the set of cells, then each contains two types of nodes: one that represents jobs, and one that represents job functions. In other words, $C = J' \cup F'$ where $J' \subseteq \mathcal{J}$ and $F' \subseteq \mathcal{F}$.

Figure 6:
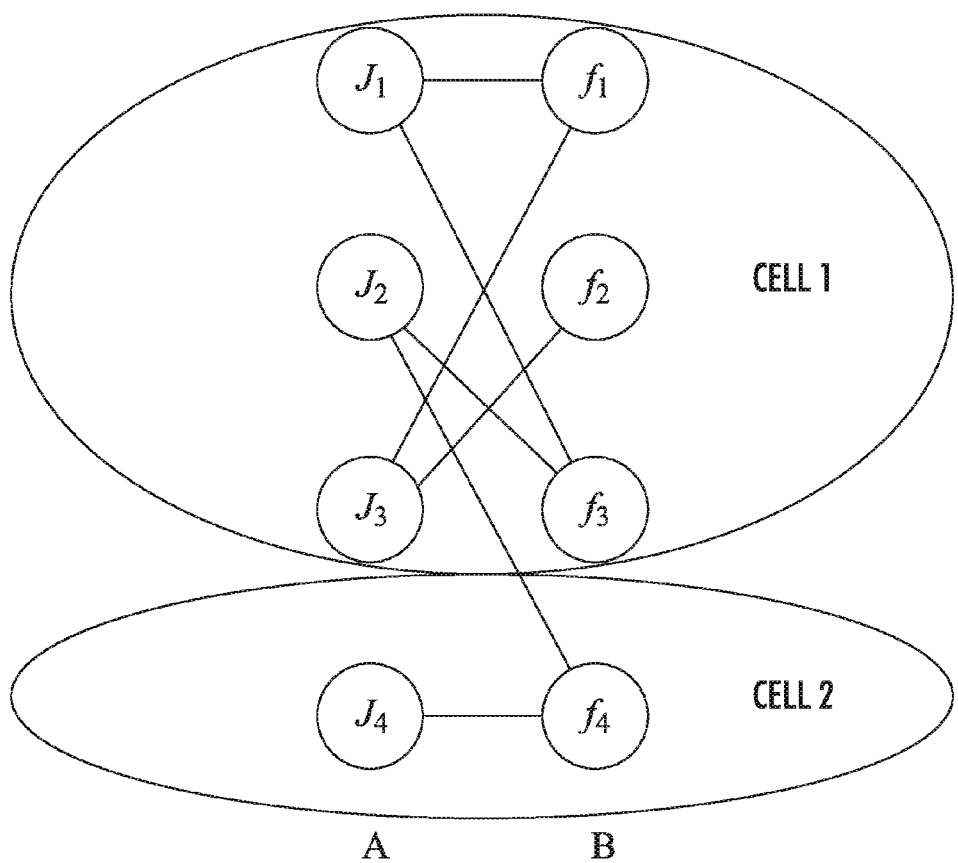
FIG. 6 illustrates an example graph partitioning according to an embodiment.

FIG. 6 illustrates an example partitioning of the graph shown in FIG. 5 according to an embodiment. The partitions in FIG. 6 assume a number of production devices=|M|=6 and a maximum number of production devices per cell=D=3.

As shown by FIG. 6, the graph is partitioned into two groupings, where each grouping corresponds to a different cell. Grouping 1 corresponds to Cell 1 and includes $f_1$, $f_2$ and $f_3$. Grouping 2 corresponds to Cell 2 and includes $f_4$.

As discussed above, each production device, $M \in \mathcal{M}$, can perform one or more job functions. $F_M$ denotes the set of job functions that a production device M can perform. $\mathcal{F}^M$ denotes the set of job functions supported by all production devices in the production environment.

In an embodiment, an electronic device may apply an algorithm to determine a set of production devices for each cell that can cover all of the job functions in that cell. The algorithm may be an iterative greedy set cover algorithm. In each iteration, an electronic device may identify a cell and one or more job functions associated with the cell. The electronic device may identify a production device that can perform the maximum number of job functions in a cell, subject to the condition that the number of production devices already assigned to the cell is less than the maximum number of production devices permitted per cell (D). The electronic device may assign the identified production device to the cell.

If there are remaining job functions that are not covered by a production device assigned to the cell, the electronic device may repeat the process and identify a production device that can perform the maximum number of remaining job functions, subject again to the condition that the number of production devices already assigned to the cell is less than D.

Once the electronic device has exhausted job functions or has assigned D production devices to the cell, the electronic device may stop the process. It may be the case that D number of production devices are assigned to a cell but not every job function is addressed by the production devices of a cell. FIG. 7 illustrates example pseudocode for assigning production devices to cells in the manner discussed above according to an embodiment.

In certain embodiments, all of the production devices may not be assigned to the cells. For instance, an electronic device may assign production devices to cells and the assigned production devices may cover all of the job functions required by the cells. However, not all of the production devices may be assigned, so certain cells may include fewer than D production devices.

In this case, an electronic device may assign the unassigned production devices to one or more cells. The electronic device may identify an unassigned production device that can perform a maximum number of functions for a cell having fewer than D production devices, and may assign the unassigned production device to the cell. The electronic device may repeat this process until each unassigned production device is assigned to a cell, or until each cell is assigned a total of D production devices. FIG. 8 illustrates example pseudocode for assigning unassigned production devices to cells in the manner discussed above according to an embodiment.

As a result of the analysis, an electronic device may determine an initial cell design for a production environment. The initial cell design may be one that minimizes inter-cellular movement. However, in various embodiments, job lateness may also be considered in determining cell designs. Referring back to FIG. 3, an electronic device may improve or refine 302 the initial cell design. In certain embodiments, an electronic device may improve 302 the initial cell design by refining it to account for job lateness as well.

Figure 9:
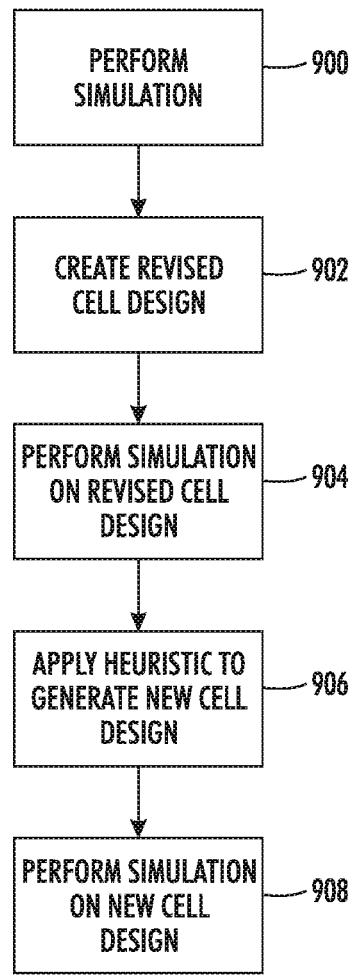
FIG. 9 illustrates a flow chart of an example method of refining the initial cell design according to an embodiment.

FIG. 9 illustrates a flow chart of an example method of refining the initial cell design according to an embodiment. As shown in FIG. 9, an electronic device may perform 900 one or more simulations using the job list and the initial cell design. The one or more simulations may provide one or more metrics pertaining to the operation of the initial cell design. For instance, one or more simulations may result in the following three metrics: number of late jobs, the inter-cellular movement of each job, and the utilization of each production device.

For purposes of this disclosure, the number of late jobs may be denoted by Latejobs ($\mathfrak{J}$, C), indicating that the number of late jobs is determined using the job list and the initial cell design, C.

The inter-cellular movement of a job refers to a number of times the job moves from one cell to another during its processing. The inter-cellular movement of a job in the job list, $J \in \mathfrak{J}$, may be denoted as Intermovement (J, C). The total inter-cellular movement of a job list may be the sum of the inter-cellular movement of all jobs in the job list, Intermovement (($\mathfrak{J}$, , C)=$\Sigma_{J \in \mathfrak{J}}$ Intermovement(J,C).

In an embodiment, a utilization of a production device in the set of production devices for a cell, $M \in \mathcal{M}_i$, may be represented as Util(M, C)$\in$[0,100].

As an example, a cell design may have a two cells, $C_1$ and $C_2$, where $C_1$={BWPrinter1, Binder1}, $C_2$={BWPrinter2, Binder2}, and D=2. A simulation using a job list, $\mathfrak{J}$, and an initial cell design, C, may result in the following outputs:

Latejobs ($\mathfrak{J}$, C)=20
Intermovement ($\mathfrak{J}$, C)=0
Util(BWPrinter1, C)=70
Util(Binder1, C)=20
Util(BWPrinter2, C)=10
Util(Binder2, C)=10

In various embodiments, an electronic device may adjust one or more parameters of a simulation based on the input to create 902 a revised cell design. An electronic device may automatically adjust one or more parameters, or an electronic device may adjust one or more parameters in response to receiving input from a user.

For instance, in the above example, the number of late jobs is high despite the fact that the inter-cellular movement is '0'. One justification for this scenario may be that a majority of the jobs are directed to $C_1$ as part of the simulation, which is reflected in the high utilization of BWPrinter1. As a remedy, an electronic device may adjust the initial cell design to try and minimize the number of late jobs. For example, an electronic device may move a similar under-utilized production device (BWPrinter2) from cell $C_2$ to $C_1$. This transfer increases the number of production devices in $C_1$ to 3 though, so the electronic device may move an under-utilized production device in $C_1$ (Binder1) to $C_2$. As such, the electronic device creates 902 a new cell design, Ĉ, that includes $C_1$={BWPrinter1, BWPrinter2}, $C_2$={Binder1, Binder2}.

In an embodiment, an electronic device may perform 904 one or more simulations using the new cell design, which may result in one or more updated outputs. For instance, in the above, example, performing 904 a simulation on the new cell design, Ĉ, may result in the following outputs:

Latejobs ($\mathfrak{J}$, C)=6
Intermovement ($\mathfrak{J}$, C)=10
Util(BWPrinter1, C)=40
Util(Binder1, C)=30
Util(BWPrinter2, C)=20
Util(Binder2, C)=10

As illustrated from the above example, it may not always be practical to minimize both the number of late jobs and the inter-cellular movement. For example, by reducing the number of late jobs in the above example from 20 to 6, the inter-cellular movement increased from 0 to 10.

An electronic device may apply 906 a heuristic to a cell design to improve the design. The heuristic uses a parameter, $\tau$, which has a value between 0 and 100. According to the heuristic, the utilization value of each production device, M, is to be less than $\tau$ for each improved cell design.

The heuristic also uses a utilization rate, represented by $\alpha$, which may have a value between 0 and 100. The utilization rate is initially set as a high value such as, for example, 90.

In the first iteration, an electronic device may identify a production device M in cell $C_i$ such that the utilization of M is greater than a. If the electronic device identifies such a production device, then the electronic device may determine if another production device M' (in another cell, $C_j$) exists with a low utilization (Util(M', C)<$\tau$). If the electronic device determines that such a production device exists, the electronic device may determine if the total number of production devices in $C_i$ is less than D. If so, then the electronic device may move production device M' from cell $C_j$ to cell $C_i$. If not, then the electronic device may determine if there is an under-utilized production device M" in cell $C_i$ with a Util(M",C)<$\tau$). If yes, then the electronic device may swap M' and M" from cells $C_i$ and $C_j$. This ensures that number of production devices in $C_i$ is equal to D. The cell design that results from application of the heuristic may be referred to as NC.

An electronic device may perform 908 one or more simulations on the new cell design, NC. If the number of late jobs in NC is less than the original design, then the new design is better and the electronic device may adopt NC as the final design.

If the number of late jobs in NC is not less than the original design, then the electronic device may decrease the value of a by a certain amount, and repeat the simulation process until the number of late jobs in NC is less than the original design, or until a certain number of simulations are performed. For example, if an electronic device performs four simulations and the number of late jobs in NC is not less than the original design, the electronic device may adopt the original design as the final design.

Referring back to FIG. 3, once the electronic device has adopted a final design, the electronic device may present the final design to a user. For instance, an electronic device may cause a visual representation of the final design to be displayed to a user on a display device. Alternatively, an electronic device may transmit a representation of the final design to a user such as for example, via email, text message and/or the like.

In certain embodiments, the electronic device may present the final design to a user in conjunction with one or more other designs such as, for example, the original design. The electronic device may receive a selection of a presented design from a user such as, for instance, a production environment manager. Based on the selected design, one or more cells may be designed with appropriate production devices in each.

In certain embodiments, an electronic device may cause one or more settings of a production device to be updated to reflect the cell to which the production device was assigned. For instance, a cell may be given a certain name or other identifier. An electronic device may send a production device one or more instructions that include the cell identifier. The production device may receive the instructions and may update one or more of its settings to reflect the cell to which it has been assigned. As such, if an electronic device sends an inquiry to a production device, the production device may be able to respond with the cell to which it belongs.

In various embodiments, a setting may be a hardware setting. The setting may be associated with one or more functions that are performable by the production device and associated with the cell to which the production device is assigned. For instance, a multifunction device that is capable of black-and-white printing, color printing, binding and scanning may be assigned to a cell that only requires black-and-white printing, color printing, and binding. As such, an electronic device may cause one or more hardware settings of the multifunction device to be enabled to only permit the multifunction device to perform black-and-white printing, color printing, and binding. One or more settings associated with scanning may be disabled or otherwise rendered inoperable so that the multifunction device cannot perform scanning. If the cell design changes, or if the functions associated with the cell subsequently change to allow the multifunction device to perform scanning, one or more settings of the multifunction device may be updated. Changing a production device's settings to enable only the functions required by the cell may improve the efficiency of the production device by only focusing power consumption and energy to the functions that are needed by the cell.

Figure 10:
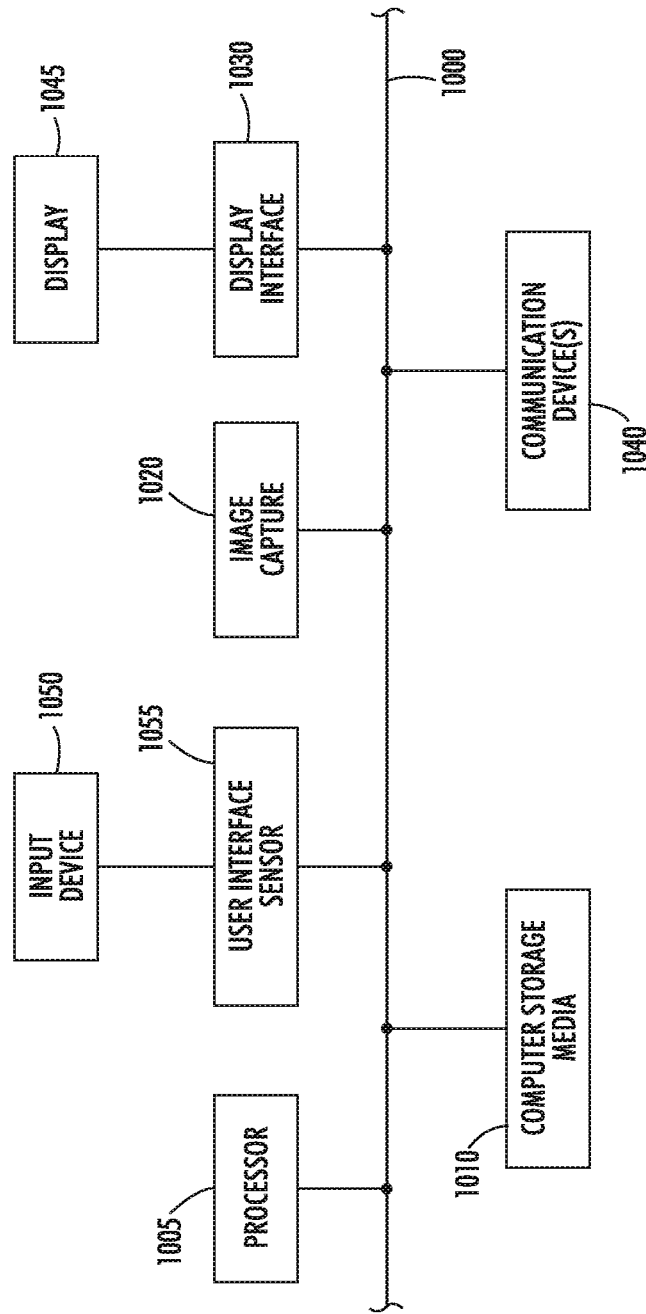
FIG. 10 illustrates a block diagram of example hardware that may be used to contain or implement program instructions according to an embodiment.

FIG. 10 depicts an example of internal hardware that may be included in any of the electronic components of the system, such as the user electronic device, or the remote server. An electrical bus 1000 serves as an information highway interconnecting the other illustrated components of the hardware. Processor 1005 is a central processing device of the system, configured to perform calculations and logic operations required to execute programming instructions. As used in this document and in the claims, the terms "processor" and "processing device" may refer to a single processor or any number of processors in a set of processors. Read only memory (ROM), random access memory (RAM), flash memory, hard drives and other devices capable of storing electronic data constitute examples of memory devices 1010. A memory device may include a single device or a collection of devices across which data and/or instructions are stored.

An optional display interface 1030 may permit information from the bus 1000 to be displayed on a display device 1045 in visual, graphic or alphanumeric format. An audio interface and audio output (such as a speaker) also may be provided. Communication with external devices may occur using various communication devices 1040 such as a transmitter and/or receiver, antenna, an RFID tag and/or short-range or near-field communication circuitry. A communication device 1040 may be attached to a communications network, such as the Internet, a local area network or a cellular telephone data network.

The hardware may also include a user interface sensor 1045 that allows for receipt of data from input devices 1050 such as a keyboard, a mouse, a joystick, a touchscreen (which may be part of the display), a remote control, a pointing device, a video input device and/or an audio input device. Data also may be received from an imaging capturing device 1020 such as a scanner or camera.

In some embodiments, the system may use additional hardware components, such as a biometric device, a clock circuit and or a positioning system (such as a Global Positioning System sensor) to detect a time or location and use that information to inform a cell design.

It will be appreciated that various of the above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

What is claimed is:

1. A method of generating a cell design of print production devices for a print production environment, the method comprising:
   receiving, by an electronic device, a print job list from a scheduling queue of an intake system for a print production environment, wherein the print job list comprises a plurality of print jobs to be processed by the print production environment;
   identifying, by the electronic device, a plurality of print production devices located in the production environment, wherein each print production device comprises hardware for performing one or more functions on a print job;
   for each of the plurality of print jobs, determining a function sequence associated with processing the print job;
   identifying a list of functions associated with the plurality of print jobs, wherein the list of functions comprises an indicator of each unique function from the function sequences for the print jobs;
   generating, by the electronic device, a graph comprising one or more first nodes, one or more second nodes and one or more edges between one or more of the first nodes and one or more of the second nodes, wherein each first node represents a print job from the plurality of print jobs, wherein each second node represents a function from the list of functions, wherein each edge represents an indication that the print job associated with corresponding first node of the edge requires the function associated with the corresponding second node of the edge;
   determining a threshold value equal to a maximum number of print production devices permitted per cell of the print production environment;
   partitioning, by the electronic device, the graph into a number of groups equal to the threshold value such that a number of edges extending between groups is minimized, wherein each group corresponds to a cell of the print production environment;
   generating an initial cell design for the print production environment by the electronic device by assigning one or more of the plurality of print production devices to the cells; and causing, by the electronic device, a hardware setting of each of the plurality of print production devices to be updated to reflect the cell to which the print production device was assigned and to enable the print production device to perform one or more functions associated with the cell to which the print production device was assigned.

2. The method of claim 1, wherein generating an initial cell design for the print production environment by assigning one or more of the plurality of print production devices to the cells comprises:
   for each cell:
   identifying, from the graph, the functions associated with the cell, identifying a print production device that is capable of performing a maximum number of the functions and that has not already been assigned to another cell,
   determining whether the cell comprises a number of print production devices that is less than the threshold value, and in response to determining that the cell comprises a number of print production devices that is less than the threshold value, assigning the identified print production device to the cell.

3. The method of claim 2, further comprising:
determining whether one or more of the print production devices have not been assigned to a cell; and
in response to determining that one or more of the print production devices have not been assigned to a cell:
identifying a cell from that includes fewer than the threshold number of print production devices, and
assigning at least one of the one or more unassigned print production devices to the identified cell.

4. The method of claim 1, further comprising:
performing a simulation of an operation of the initial cell design in processing the print job list to generate the following performance metrics associated with the initial cell design: a number of late print jobs, an inter-cellular level of movement, and
a utilization value associated with one or more of the print production devices in the cell.

5. The method of claim 4, further comprising:
identifying a threshold utilization rate for the plurality of print production devices;
identifying a cell design parameter;
identifying a print production device from a first cell in the initial cell design whose utilization value is greater than the threshold utilization rate;
identifying a second print production device from a second cell in the initial cell design whose utilization value is less than the cell design parameter;
determining whether the first cell includes a number of print production devices that is less than the threshold value; and
in response to determining that the first cell includes a number of print production devices that is less than the threshold value, assigning the second print production device to the first cell to generate an updated cell design.

6. The method of claim 5, further comprising:
performing a second simulation of an operation of the updated cell design in processing the print job list to generate the following performance metrics associated with the updated cell design:
a number of late print jobs, an inter-cellular level of movement, and
a utilization value associated with one or more of the print production devices in the cell; and adopting the updated cell design as a final cell design if the number of late print jobs associated with the updated cell design is less than the number of late print jobs associated with the initial cell design.

7. The method of claim 4, further comprising:
identifying a threshold utilization rate for the plurality of print production devices;
identifying a cell design parameter;
identifying a print production device from a first cell in the initial cell design whose utilization value is greater than the threshold utilization rate;
identifying a second print production device from a second cell in the initial cell design whose utilization value is less than the cell design parameter;
determining whether the first cell includes a number of print production devices that is less than the threshold value;
in response to determining that the first cell does not include a number of print production devices that is less than the threshold value, determining whether the first cell comprises a third print production device whose utilization value is less than the cell design parameter; and
in response to determining that the first cell comprises a third print production device whose utilization value is less than the cell design parameter, generating an update cell design by:
assigning the third print production device to the second cell, and assigning the second print production device to the first cell.

8. The method of claim 7, further comprising:
performing a second simulation of an operation of the updated cell design in processing the print job list to generate the following performance metrics associated with the updated cell design:
a number of late print jobs, an inter-cellular level of movement, and
a utilization value associated with one or more of the print production devices in the cell; and
adopting the updated cell design as a final cell design if the number of late print jobs associated with the updated cell design is less than the number of late jobs associated with the initial cell design.

9. A method of generating a cell design for a production environment, the method comprising:
receiving, by an electronic device, a job list from a scheduling queue of an intake system for a production environment, wherein the job list comprises a plurality of jobs to be processed by the production environment;
identifying, by the electronic device, a plurality of production devices located in the production environment;
for each of the plurality of jobs, determining a function sequence associated with processing the job;
identifying a list of functions associated with the plurality of jobs, wherein the list of functions comprises an indicator of each unique function from the function sequences for the jobs;
generating, by the electronic device, a graph comprising one or more first nodes, one or more second nodes and one or more edges between one or more of the first nodes and one or more of the second nodes, wherein each first node represents a job from the plurality of jobs, wherein each second node represents a function from the list of functions, wherein each edge represents an indication that the job associated with corresponding first node of the edge requires the function associated with the corresponding second node of the edge;
determining a threshold value equal to a maximum number of production devices permitted per cell of the production environment;
partitioning, by the electronic device, the graph into a number of groups equal to the threshold value such that a number of edges extending between groups is minimized, wherein each group corresponds to a cell of the production environment;
generating an initial cell design for the production environment by the electronic device by assigning one or more of the plurality of production devices to the cells; and
causing, by the electronic device, a setting of each of the plurality of production devices to be updated to reflect the cell to which the production device was assigned.

10. The method of claim 9, wherein generating an initial cell design for the production environment by assigning one or more of the plurality of production devices to the cells comprises:

for each cell:
identifying, from the graph, the functions associated with the cell, identifying a production device that is capable of performing a maximum number of the functions and that has not already been assigned to another cell,
determining whether the cell comprises a number of production devices that is less than the threshold value, and
in response to determining that the cell comprises a number of production devices that is less than the threshold value, assigning the identified production device to the cell.

11. The method of claim 9, further comprising:
performing a simulation of an operation of the initial cell design in processing the job list to generate the following performance metrics associated with the initial cell design: a number of late jobs, an inter-cellular level of movement, and
a utilization value associated with one or more of the production devices in the cell;
identifying a threshold utilization rate for the plurality of production devices;
identifying a cell design parameter;
identifying a production device from a first cell in the initial cell design whose utilization value is greater than the threshold utilization rate;
identifying a second production device from a second cell in the initial cell design whose utilization value is less than the cell design parameter;
determining whether the first cell includes a number of production devices that is less than the threshold value; and
in response to determining that the first cell includes a number of production devices that is less than the threshold value, assigning the second production device to the first cell to generate an updated cell design.

12. The method of claim 11, further comprising:
identifying a threshold utilization rate for the plurality of production devices; identifying a cell design parameter;
identifying a production device from a first cell in the initial cell design whose utilization value is greater than the threshold utilization rate;
identifying a second production device from a second cell in the initial cell design whose utilization value is less than the cell design parameter;
determining whether the first cell includes a number of production devices that is less than the threshold value;
in response to determining that the first cell does not include a number of production devices that is less than the threshold value, determining whether the first cell comprises a third production device whose utilization value is less than the cell design parameter; and
in response to determining that the first cell comprises a third production device whose utilization value is less than the cell design parameter, generating an update cell design by: assigning the third production device to the second cell, and assigning the second production device to the first cell.

13. A system for generating a cell design of print production devices for a print production environment, the system comprising:
a plurality of print production devices associated with a print production environment, wherein each print production device comprises hardware for performing one or more functions on a print job;
an electronic device; and
a non-transitory computer-readable storage medium comprising one or more programming instructions that, when executed, cause the electronic device to:
receive a print job list from a scheduling queue of an intake system for a print production environment, wherein the print job list comprises a plurality of print jobs to be processed by the print production environment,
for each of the plurality of print jobs, determining a function sequence associated with processing the print job,
identifying a list of functions associated with the plurality of print jobs, wherein the list of functions comprises an indicator of each unique function from the function sequences for the print jobs,
generating a graph comprising one or more first nodes, one or more second nodes and one or more edges between one or more of the first nodes and one or more of the second nodes, wherein each first node represents a print job from the plurality of print jobs, wherein each second node represents a function from the list of functions, wherein each edge represents an indication that the print job associated with corresponding first node of the edge requires the function associated with the corresponding second node of the edge,
determining a threshold value equal to a maximum number of print production devices permitted per cell of the print production environment,
partitioning the graph into a number of groups equal to the threshold value such that a number of edges extending between groups is minimized, wherein each group corresponds to a cell of the print production environment,
generating an initial cell design for the print production environment by the electronic device by assigning one or more of the plurality of print production devices to the cells, and causing a hardware setting of each of the plurality of production devices to be updated to reflect the cell to which the production device was assigned and to enable the production device to perform one or more functions associated with the cell to which the production device was assigned.

14. The system of claim 13, wherein the one or more programming instructions that, when executed, cause the electronic device to generate an initial cell design for the print production environment by assigning one or more of the plurality of print production devices to the cells comprise one or more programming instructions that, when executed, cause the electronic device to:
for each cell:
identify, from the graph, the functions associated with the cell, identify a print production device that is capable of performing a maximum number of the functions and that has not already been assigned to another cell,
determine whether the cell comprises a number of print production devices that is less than the threshold value, and
in response to determining that the cell comprises a number of print production devices that is less than the threshold value, assign the identified print production device to the cell.

15. The system of claim 14, wherein the computer-readable storage medium further comprises one or more programming instructions that, when executed, cause the electronic device to:
determine whether one or more of the print production devices have not been assigned to a cell; and in response to determining that one or more of the print production devices have not been assigned to a cell:
  identify a cell from that includes fewer than the threshold number of print production devices, and
  assign at least one of the one or more unassigned print production devices to the identified cell.

16. The system of claim 13, wherein the computer-readable storage medium further comprises one or more programming instructions that, when executed, cause the electronic device to:
  perform a simulation of an operation of the initial cell design in processing the print job list to generate the following performance metrics associated with the initial cell design: a number of late print jobs, an inter-cellular level of movement, and
  a utilization value associated with one or more of the print production devices in the cell.

17. The system of claim 16, wherein the computer-readable storage medium further comprises one or more programming instructions that, when executed, cause the electronic device to:
  identify a threshold utilization rate for the plurality of print production devices; identify a cell design parameter;
  identify a print production device from a first cell in the initial cell design whose utilization value is greater than the threshold utilization rate;
  identify a second print production device from a second cell in the initial cell design whose utilization value is less than the cell design parameter;
  determine whether the first cell includes a number of print production devices that is less than the threshold value; and
  in response to determining that the first cell includes a number of print production devices that is less than the threshold value, assign the second print production device to the first cell to generate an updated cell design.

18. The system of claim 17, wherein the computer-readable storage medium further comprises one or more programming instructions that, when executed, cause the electronic device to:
  perform a second simulation of an operation of the updated cell design in processing the print job list to generate the following performance metrics associated with the updated cell design:
  a number of late print jobs, an inter-cellular level of movement, and
  a utilization value associated with one or more of the print production devices in the cell; and adopt the updated cell design as a final cell design if the number of late print jobs associated with the updated cell design is less than the number of late print jobs associated with the initial cell design.

19. The system of claim 16, wherein the computer-readable storage medium further comprises one or more programming instructions that, when executed, cause the electronic device to:
  identify a threshold utilization rate for the plurality of print production devices; identify a cell design parameter;
  identify a print production device from a first cell in the initial cell design whose utilization value is greater than the threshold utilization rate;
  identify a second print production device from a second cell in the initial cell design whose utilization value is less than the cell design parameter;
  determine whether the first cell includes a number of print production devices that is less than the threshold value;
  in response to determining that the first cell does not include a number of print production devices that is less than the threshold value, determine whether the first cell comprises a third print production device whose utilization value is less than the cell design parameter; and
  in response to determining that the first cell comprises a third print production device whose utilization value is less than the cell design parameter, generate an update cell design by: assigning the third print production device to the second cell, and assigning the second print production device to the first cell.

20. The system of claim 19, wherein the computer-readable storage medium further comprises one or more programming instructions that, when executed, cause the electronic device to:
  perform a second simulation of an operation of the updated cell design in processing the print job list to generate the following performance metrics associated with the updated cell design:
  a number of late print jobs, an inter-cellular level of movement, and
  a utilization value associated with one or more of the print production devices in the cell; and adopt the updated cell design as a final cell design if the number of late print jobs associated with the updated cell design is less than the number of late jobs associated with the initial cell design.

21. A system for generating a cell design for a production environment, the system comprising:
  a plurality of print production devices associated with a print production environment, wherein each print production device comprises hardware for performing one or more functions on a print job;
  an electronic device; and
  a non-transitory computer-readable storage medium comprising one or more programming instructions that, when executed, cause the electronic device to:
  receive a job list from a scheduling queue of an intake system for a production environment, wherein the job list comprises a plurality of jobs to be processed by the production environment,
  for each of the plurality of jobs, determine a function sequence associated with processing the job,
  identify a list of functions associated with the plurality of jobs, wherein the list of functions comprises an indicator of each unique function from the function sequences for the jobs,
  generate a graph comprising one or more first nodes, one or more second nodes and one or more edges between one or more of the first nodes and one or more of the second nodes, wherein each first node represents a job from the plurality of jobs, wherein each second node represents a function from the list of functions, wherein each edge represents an indication that the job associated with corresponding first node of the edge requires the function associated with the corresponding second node of the edge,
  determine a threshold value equal to a maximum number of production devices permitted per cell of the production environment,
  partitioning the graph into a number of groups equal to the threshold value such that a number of edges extending between groups is minimized, wherein each group corresponds to a cell of the production environment, generate an initial cell design for the production environment by the electronic device by assigning one or more of the plurality of production devices to the cells, and cause a setting of each of the plurality of production devices to be updated to reflect the cell to which the production device was assigned.

22. The system of claim 21, wherein the one or more programming instructions that, when executed, cause the electronic device to generate an initial cell design for the production environment by assigning one or more of the plurality of production devices to the cells comprise one or more programming instructions that, when executed, cause the electronic device to:

for each cell:
identify, from the graph, the functions associated with the cell, identify a production device that is capable of performing a maximum number of the functions and that has not already been assigned to another cell,
determine whether the cell comprises a number of production devices that is less than the threshold value, and
in response to determining that the cell comprises a number of production devices that is less than the threshold value, assign the identified production device to the cell.

23. The system of claim 21, wherein the computer-readable storage medium further comprises one or more programming instructions that, when executed, cause the electronic device to:

perform a simulation of an operation of the initial cell design in processing the job list to generate the following performance metrics associated with the initial cell design: a number of late jobs, an inter-cellular level of movement, and
a utilization value associated with one or more of the production devices in the cell;
identify a threshold utilization rate for the plurality of production devices;
identify a cell design parameter;
identify a production device from a first cell in the initial cell design whose utilization value is greater than the threshold utilization rate;
identify a second production device from a second cell in the initial cell design whose utilization value is less than the cell design parameter;
determine whether the first cell includes a number of production devices that is less than the threshold value; and in response to determining that the first cell includes a number of production devices that is less than the threshold value, assign the second production device to the first cell to generate an updated cell design.

24. The system of claim 23, wherein the computer-readable storage medium further comprises one or more programming instructions that, when executed, cause the electronic device to:

identify a threshold utilization rate for the plurality of production devices; identify a cell design parameter;
identify a production device from a first cell in the initial cell design whose utilization value is greater than the threshold utilization rate;
identify a second production device from a second cell in the initial cell design whose utilization value is less than the cell design parameter;
determine whether the first cell includes a number of production devices that is less than the threshold value;
in response to determining that the first cell does not include a number of production devices that is less than the threshold value, determine whether the first cell comprises a third production device whose utilization value is less than the cell design parameter; and in response to determining that the first cell comprises a third production device whose utilization value is less than the cell design parameter, generate an update cell design by: assigning the third production device to the second cell, and assigning the second production device to the first cell.

* * * * *